Nov. 12, 1968   R. C. POSH   3,410,515
WEDGE BLOCK SEAT ADJUSTER
Filed Feb. 23, 1966   3 Sheets-Sheet 1

INVENTOR.
Raymond C. Posh
BY
Barnard, McGlynn & Reising
ATTORNEYS

Nov. 12, 1968

R. C. POSH 3,410,515

WEDGE BLOCK SEAT ADJUSTER

Filed Feb. 23, 1966

INVENTOR.
Raymond C. Posh
BY
Barnard, McElynn & Laing
ATTORNEYS

Nov. 12, 1968   R. C. POSH   3,410,515
WEDGE BLOCK SEAT ADJUSTER
Filed Feb. 23, 1966   3 Sheets-Sheet 3

INVENTOR.
Raymond C. Posh
BY
Barnard, McGlynn & Reising
ATTORNEYS

United States Patent Office 3,410,515
Patented Nov. 12, 1968

3,410,515
WEDGE BLOCK SEAT ADJUSTER
Raymond C. Posh, Livonia, Mich., assignor, by mesne
assignments, to Lear Siegler, Inc., Santa Monica,
Calif., a corporation of Delaware
Filed Feb. 23, 1966, Ser. No. 529,314
26 Claims. (Cl. 248—394)

ABSTRACT OF THE DISCLOSURE

A seat including a seat adjusting assembly for selectively raising and lowering the front and rear portions of the seat independently of one another and for adjusting the fore and aft position of the seat. More specifically, the invention relates to a seat adjusting assembly including a plurality of pairs of members, each pair of which are pivotally connected together and moved apart by a block forced therebetween in a wedge-like action. A pair of coacting surfaces are disposed between each member and the block and at least one pair of the coacting surfaces are arcuate to the degree necessary to maintain total sliding contact between the surfaces along the entire overlapping length thereof as the block moves relative to the members.

---

Systems of the type heretofore utilized for adjusting the position of a seat typically comprise complex mechanisms which often employ jacks and the like. Such systems are expensive to fabricate and are often difficult to maintain due to their complexity. Furthermore, and perhaps more importantly, such prior art systems are accompanied by a space problem in that they occupy a significant amount of space below the seat. Those concerned with seat adjusting assemblies are constantly seeking a mechanism for adjusting the position of a seat which utilizes a minimum of space beneath the seat but may be actuated to raise the seat to the required height.

Accordingly, it is an object and feature of this invention to provide a seat adjusting assembly which utilizes a minimum of space and provides three degrees of movement; to wit, fore and aft, raising and lowering of the front of the seat, and raising and lowering of the rear of the seat.

Another object and feature of the instant invention is to provide a seat adjusting assembly utilizing a wedge principle wherein a plurality of pairs of members are pivotally connected together and moved apart by a block forced therebetween in a wedge-like action and wherein the coacting surfaces between the block and one of the members are parallel and arcuate to the degree necessary to maintain total sliding contact between the surfaces as the block moves relative to the members.

In general, these and other objects and features of the invention may be attained by a seat adjusting assembly including a support means, a slider member slidably supported on the support means, a lever member pivotally connected at one end thereof to the slider member, and a mount means pivotally connected at the other end of the lever member. A first block is forced between the slider member and the lever member in a wedge-like action to pivot the lever member relative to the slider member for raising and lowering the rear of the seat. A second block is disposed between the lever member and the mount means for being forced therebetween in a wedge-like action to pivot the mount means relative to the lever member to raise and lower the front of the seat. The first block has an arcuate surface for sliding coaction with a like arcuate surface on the lever member so that, upon movement of the block and consequent pivotal movement of the lever member, total sliding contact is maintained along the overlapping portions of the surfaces on the first block and on the lever member. Likewise, the second block has an arcuate surface which slidably coacts with a like arcuate surface on the lever member so that total sliding contact is maintained along the overlapping portions of the arcuate surfaces upon movement of the second block.

Other objects and attendant advantages of the present invention will be readily appreciated as the same becomes better understood by reference to the following detailed description when considered in connection with the accompanying drawings wherein.

Figure 1:
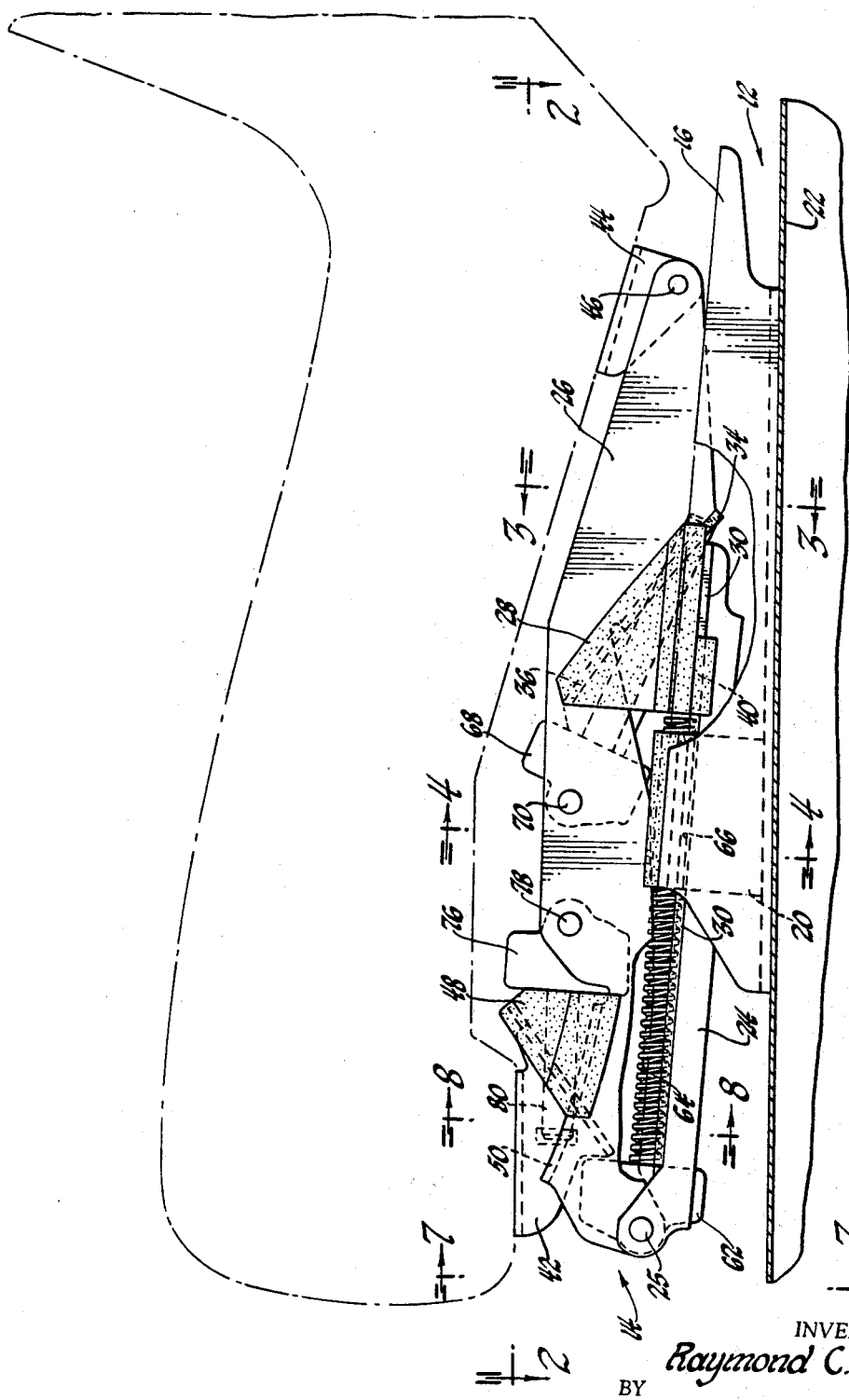
FIGURE 1 is a side elevational view partially broken away of a preferred embodiment of the instant invention.

Referring not to the figures wherein like numerals indicate like or corresponding parts throughout the several views, a seat adjusting assembly is generally shown at 10. The assembly 10 includes a support means, generally shown at 12, and a wedge means, generally shown at 14. The assembly illustrated includes parallel and similar units but for simplicity only one unit will be described.

The support means 12 includes a support member 16 having a substantially U-shaped cross section with a pair of oppositely disposed flanges 18 extending laterally from the extremities of the legs of the support member 16. The support means 12 also includes a stationary block 20 which is secured to the support member 16 by adhesion, a force fit, or the like. The support member 16 rests upon the support structure 22, which is normally the floor of an automobile, truck, or the like.

The wedge means 14 is adapted for supporting and adjusting the position of a seat, which is shown in phantom in FIGURE 1. The wedge means 14 is operatively connected to the support means 12 for sliding movement relative thereto, as will become more clear hereinafter. The wedge means 14 includes at least two members, the slider member 24 and the lever member 26, which are moved apart by a first block 28 as it is forced therebetween in a wedge-like action. One of the members 24 and 26 and the block 28 have at least one pair of coacting surfaces which slide relative to one another as the block 28 moves. The other of the members 24 and 26 and the first block also have at least one pair of coacting surfaces which slide relative to one another as the block 28 moves. At least one pair of the coacting surfaces is arcuate to the degree necessary to maintain total sliding contact between each pair of coacting surfaces along the entire overlapping length thereof as the first block 28 moves relative to the members 24 and 26. That is to say, the lever member 26 is pivotally connected at a first end thereof to the slider member 24 by the pin 25 and the coacting surfaces between the slider member 24 and the first block 28 are formed by a pair of flanges 30 extending from the slider member 24 and slidably disposed in a first pair of grooves 32 in the first block 28. The coacting surfaces between the lever member 26 and the block 28 are formed by a first pair of flanges 34 extending from the lever member 26 and slidably disposed in a second pair of grooves 36 in the block 28.

Figure 6:
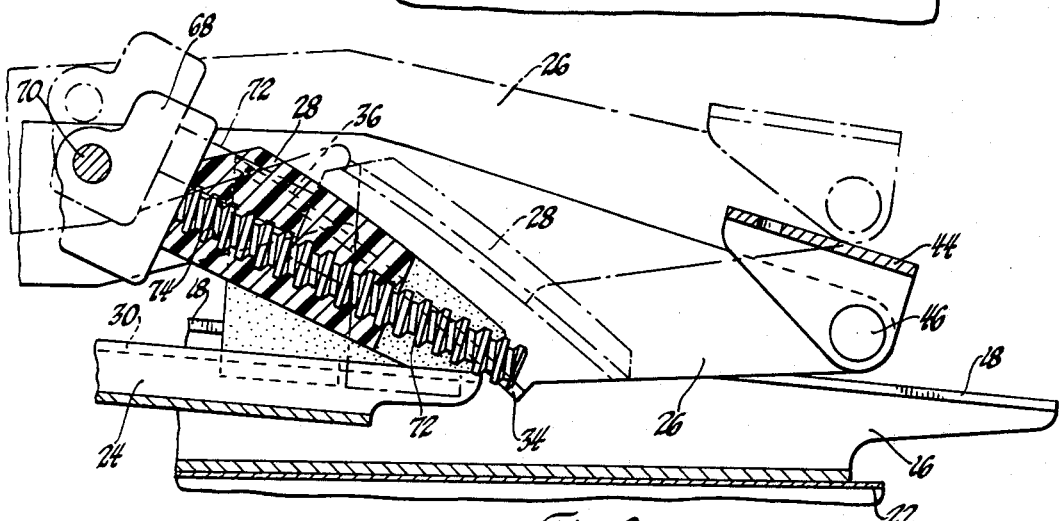
FIGURE 6 is an enlarged cross-sectional view partially broken away and taken substantially along line 6—6 of FIGURE 2.
Figure 7:
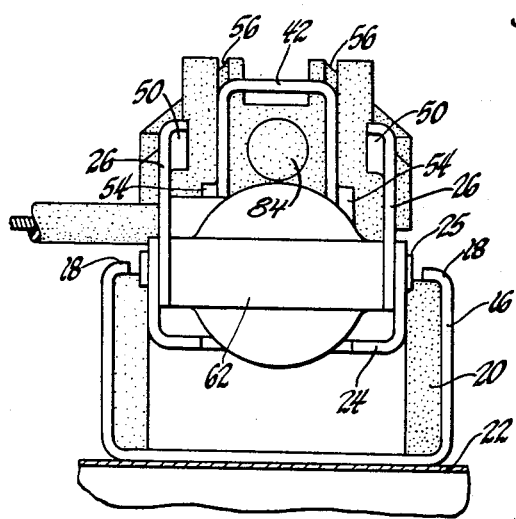
FIGURE 7 is an enlarged end view taken substantially along line 7—7 of FIGURE 1.
Figure 8:
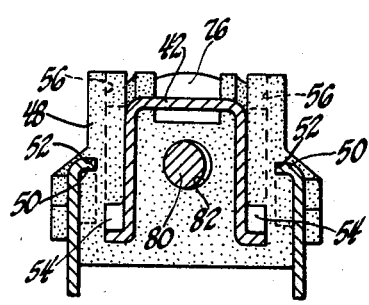
FIGURE 8 is an enlarged cross-sectional view partially broken away and taken substantially along line 8—8 of FIGURE 1.

The flanges 34 which extend from the lever member 26 are, therefore, parallel and arcuate as are the coacting pair of grooves 36 in the first block 28 in order to maintain the total sliding contact between the flanges 34 and the coacting grooves 36 along the entire overlapping length thereof as the first block 28 moves relative to the members 24 and 26. This is more clearly shown in FIGURE 6 where the block 28 is shown in a moved phantom position. As the block 28 is moved to the right to the phantom position in FIGURE 6, the lever member 26 pivots relative to the slider member 24 about the axis of the pin 25. Thus, the flanges 34 move generally upwardly as the block 28 moves to the right. It will be evident that if the flanges 34 and the coacting grooves 36 are straight lines, the angle of such straight flanges would change relative to a horizontal plane as the block 28 moves to the right and pivots the lever member 26 upwardly. Hence, if the block 28 merely has a plane, straight surface contacting with a plane, straight surface on the lever member 26 and the block 28 is moved to the right, the plane, straight surface of the lever 26 will change its angular relationship with a horizontal plane, but the coacting plane surface on the block 28 will not change its angular relationship so that total sliding contact between the two surfaces will not be maintained. In fact, with two such plane surfaces coacting between the block 28 and the lever member 26, line contact would result between the block 28 and the lever member 26. The coacting surfaces between the block 28 and the lever member 26 formed by the flanges 34 and grooves 36 are, therefore, arcuate to maintain total sliding contact therebetween over the entire overlapping length thereof as the block 28 moves. The degree of curvature of the flanges 34 and the grooves 36 depends upon the geometrical relationship of the components.

The flanges 30 on the slider member 34 are also slidably disposed in a pair of grooves 38 in the stationary block 20 whereby the slider member 24 is slidably disposed in both the stationary block 20 and the first block 28.

The first block 28 is also disposed in sliding engagement with the support member 16 of the support means 12 in that the flanges 18 on the support member 16 are slidably disposed in a third pair of grooves 40 in the first block 28. The first pair of grooves 32 in the first block 28 are substantially parallel to the third pair of grooves 40 in the first block 28. The first pair of grooves 32 in the first block 28 are disposed at an acute angle with the second pair of grooves 36. The first flanges 34 on the lever member 26, therefore, slide along the second pair of grooves 36 in the first block 28 to pivot the lever member 26 relative to the slider member 24 upon movement of the block 28 relative to the slider member 24.

The wedge means 14 further includes a mount means adapted to support a seat and the mount means includes the brackets 42 and 44. It is to be understood, however, that the brackets 42 and 44 may take the form of one unitary member. Thus, the mount means is pivotally connected by the pin 46 to the second end of the lever member 26. The brackets 42 and 44 of the mount means are movable relative to the lever member 26 by a second block 48 which is forced therebetween in a wedge-like action. The lever member 26 and the second block 48 have at least one pair of coacting surfaces which slide relative to one another as the second block 48 moves. The mount means and the second block 48 also have at least one pair of coacting surfaces which slide relative to one another as the second block 48 moves. At least one pair of the coacting surfaces associated with the second block 48 are also arcuate to the degree necessary to maintain total sliding contact between each pair of coacting surfaces along the entire overlapping length thereof as the second block moves relative to the lever member and relative to the mount means. More specifically, the coacting surfaces between the second block 48 and the lever member 26 are formed by a second pair of flanges 50 extending from the lever member 26 and slidably disposed in a first pair of grooves 52 in the second block 48. The coacting surfaces between the second block 48 and the mount means are formed by a first pair of flanges 54 extending from the bracket 42 of the mount means and slidably disposed in a second pair of grooves 56 in the second block 48. The second pair of flanges 50 are parallel and arcuate, as are the first pair of grooves 52 in the second block 48, whereby total sliding contact is maintained between the grooves 52 and 56 of the block 48 and the respective flanges 50 and 54. In other words, the flanges 50 and the coacting grooves 52 are arcuately curved for the same reason that the flanges 34 and coacting grooves 36 are arcuately curved, as discussed hereinbefore.

The first pair of grooves 52 are disposed substantially at an acute angle with the second pair of grooves 56 in the second block 48 so that the first pair of flanges 54 slide along the second pair of grooves 56 to pivot the brackets 42 and 44 of the mount means relative to the lever member 26 about the axis of the pin 46 upon movement of the second block 48.

The wedge means 14 also includes the drive means, generally shown at 60, for moving the slider member 24 relative to the support member 16, and for moving the first block 28 relative to the slider member 24 to pivot the lever member 26 relative to the slider member 24, and for moving the second block 48 relative to the lever member 26 to pivot the brackets 42 and 44 of the mount means relative to the lever member 26. The drive means 60 includes a first gear box 62 connected through the pin 25 to the slider member 24. A first threaded shaft 64 extends from the first gear box 62 and threadedly engages a threaded bore 66 in the stationary block 20 whereby the slider member 24 moves relative to the support member 16 upon rotation of the threaded shaft 64.

The drive means 60 also includes a second gear box 68 which is pivotally connected through the pin 70 to the lever member 26. A second threaded shaft 72 extends from the second gear box 68 and threadedly engages a threaded bore 74 in the first block 28 whereby the first block 28 slides along the slider member 24 and the lever member 26 upon rotation of the second threaded shaft 72 to pivot the lever member 26 relative to the slider member 24.

The drive means 60 further includes a third gear box 76 which is pivotally connected by the pin 78 to the lever member 26. A third threaded shaft 80 extends from the third gear box 76 and threadedly engages a threaded bore 82 in the second block 48 whereby the second block 48 slides along the lever member 26 and the bracket 42 of the mount means upon rotation of the third threaded shaft 80 to pivot the brackets 42 and 44 of the mount means relative to the lever member 26 about the axis of the pin 46.

A cap or end stop means 84 is disposed on the end of the threaded shaft 80 for contacting the block 48 to act as a stop. Such a stop means 84 may also be utilized on the threaded shafts 64 and 72.

Figure 2:
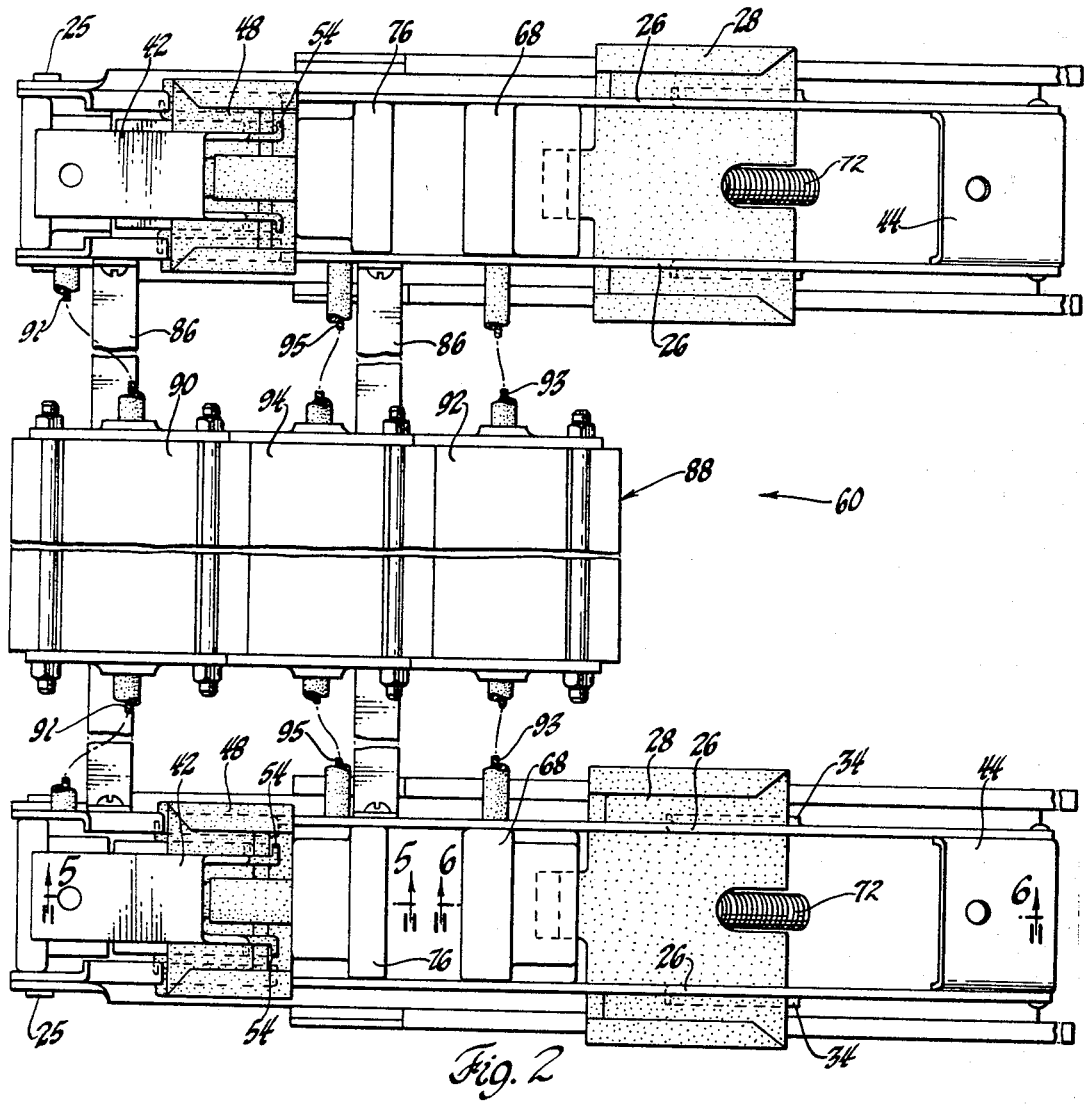
FIGURE 2 is a plan view taken substantially along line 2—2 of FIGURE 1.
Figure 3:
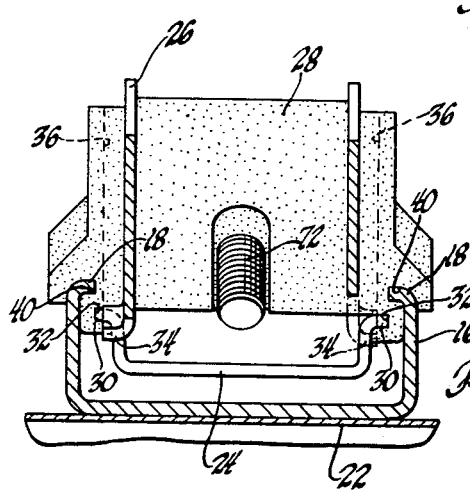
FIGURE 3 is an enlarged cross-sectional view taken substantially along line 3—3 of FIGURE 1.
Figure 4:
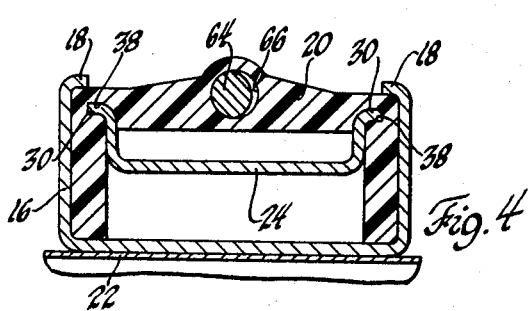
FIGURE 4 is an enlarged cross-sectional view taken substantially along line 4—4 of FIGURE 1.
Figure 5:
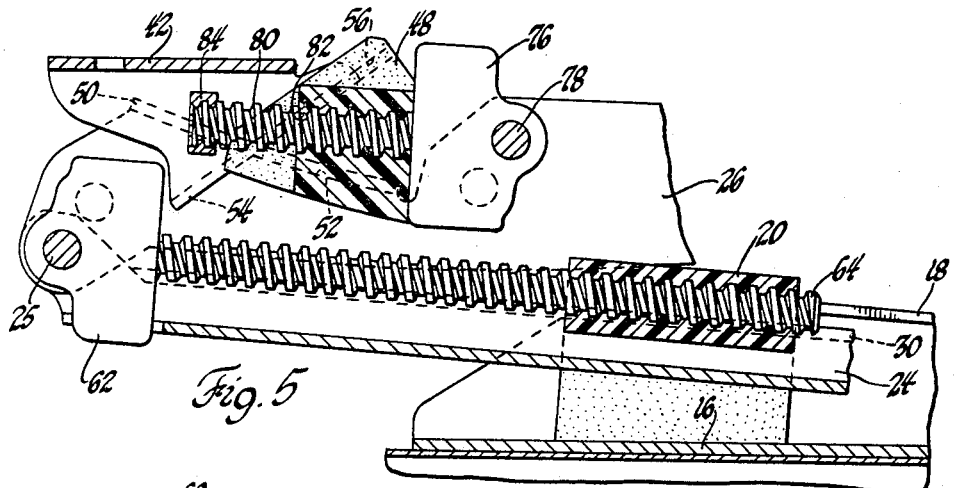
FIGURE 5 is an enlarged cross-sectional view partially broken away and taken substantially along line 5—5 of FIGURE 2.

The invention has been described in terms of one unit; however, the seat adjustment assembly preferably utilizes a second support means and a second wedge means as illustrated in FIGURE 2. The second support means and the second wedge means comprise like elements and are disposed in parallel relationship with the first support means and the first wedge means such that a pair of support members 86 are disposed therebetween for supporting the motor means, generally indicated at 88. The motor means 88 includes the motors 90, 92 and 94. The first motor 90 is operatively connected by the motion transmitting elements 91 to the first gear box 62 of both of the wedge means whereby the slider members 24 thereof are moved in unison upon actuation of the first motor 90 to adjust the fore and aft position of the seat, the seat being attached to the brackets 42 and 44 of the mount means. The second motor 92 is operatively connected through the motion transmitting elements 93 to the second gear boxes 68 whereby both lever members 26 are pivoted in unison upon actuation of the second motor 92 to raise and lower the rear of the seat. The third motor 94 is operatively connected to both of the third gear boxes 76 by the flexible motion transmitting elements 95 whereby the brackets 42 and 44 of the mount means are pivoted in unison upon actuation of the third motor 94 to raise and lower the front of the seat.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An adjustable seat assembly comprising: wedge means adapted for supporting a seat and for adjusting the position theerof, said wedge means including at least two members which are moved apart by a first block forced therebetween in a wedge-like action, one of said members and said first block having at least one pair of elongated coacting surfaces which slide relative to one another as said first block moves, and the other of said members and said first block having at least one pair of elongated coacting surfaces which slide relative to one another as said first block moves, at least one pair of said coacting surfaces being arcuate to the degree necessary to maintain total sliding contact between each pair of said coacting surfaces along the entire overlapping length thereof as said first block moves relative to said members.

2. An assembly as set forth in claim 1 wherein one of said members is a slider member and the other of said members is a lever member pivotally connected at a first end thereof to said slider member.

3. An assembly as set forth in claim 2 wherein said first-mentioned coacting surfaces are formed by a pair of flanges extending from said slider member and slidably disposed in a first pair of grooves in said first block, and said second-mentioned coacting surfaces are formed by a first pair of flanges extending from said lever member and slidably disposed in a second pair of grooves in said first block.

4. An assembly as set forth in claim 3 wherein said first flanges extending from said lever member are parallel and arcuate and said second pair of grooves in said first block are parallel and arcuate to maintain said total sliding contact.

5. An assembly as set forth in claim 4 wherein said first pair of grooves are disposed at an acute angle with said second pair of grooves so that said first flanges of said lever member slide along said second pair of grooves in said first block to pivot said lever member relative to said slider member upon movement of said first block relative to said slider member.

6. An assembly as set forth in claim 5 including drive means for moving said first block relative to said slider member and said lever member.

7. An assembly as set forth in claim 6 wherein said drive means includes a gear box pivotally connected to said lever member, and a threaded shaft extending from said gear box and threadedly engaging a threaded bore in said first block whereby said first block slides along said slider member and said lever member upon rotation of said threaded shaft to pivot said lever member relative to said slider member.

8. An adjustable seat assembly comprising: support means, wedge means adapted for supporting a seat and for adjusting the position thereof and operatively connected to said support means for sliding movement relative thereto, said wedge means including at least two members which are moved apart by a first block forced therebetween in a wedge-like action, one of said members and said first block having at least one pair of elongated coacting surfaces which slide relative to one another as said first block moves, the other of said members and said first block having at least one pair of elongated coacting surfaces which slide relative to one another as said first block moves, at least one pair of said coacting surfaces being arcuate to the degree necessary to maintain total sliding contact between each pair of said coacting surfaces along the entire overlapping length thereof as said first block moves relative to said member, one of said members being a slider member and the other of said members being a lever member pivotally connected at a first end thereof to said slider member, mount means pivotally connected to the second end of said lever and being movable relative thereto by a second block forced therebetween in a wedge-like action, said lever member and said second block having at least one pair of elongated coacting surfaces which slide relative to one another as said second block moves, said mount means and said second block having at least one pair of elongated coacting surfaces which slides relative to one another as said second block moves, at least one pair of said coacting surfaces associated with said second block being arcuate to the degree necessary to maintain total sliding contact between each pair of said last-mentioned coacting surfaces along the entire overlapping length thereof as said second block moves relative to said lever and said mount means, said support means including a stationary block, said slider member being slidably supported by said stationary block and said first block.

9. An assembly as set forth in claim 8 wherein said first block is disposed in sliding engagement with said support means.

10. An assembly as set forth in claim 9 wherein said wedge means includes drive means for moving said slider member relative to said support means and for moving said first block relative to said slider member to pivot said lever member relative to said slider member and for moving said second block relative to said lever member to pivot said mount means relative to said lever member.

11. An assembly as set forth in claim 10 including a second support means and a second wedge means comprising like elements and disposed in parallel relationship with said first-mentioned support means and said first-mentioned wedge means respectively, said drive means having a first mode of operation whereby the slider members are moved in unison to adjust the fore and aft position of the seat to be attached to the mount means, said drive means having a second mode of operation for moving said respective first blocks to pivot said lever members in unison to raise and lower one of the rear and front of the seat to be attached to said mount means, and said drive means having a third mode of operation for moving said respective second blocks in unison to pivot said mount means in unison to raise and lower the other one of the rear and front of the seat to be attached to said mount means.

12. An adjustable seat assembly comprising: support means, wedge means adapted for supporting a seat and for adjusting the position thereof and operatively connected to said support means for sliding movement relative thereto, said wedge means including at least two members which are moved apart by a first block forced therebetween in a wedge-like action, one of said members and said first block having at least one pair of coacting surfaces which slide relative to one another as said first block moves, and the other of said members and said first block having at least one pair of coacting surfaces which slide relative to one another as said first block moves, said first mentioned coacting surfaces being formed by a pair of flanges extending from said slider member and slidably disposed in a first pair of grooves in said first block, said second mentioned coacting surfaces being formed by a first pair of flanges extending from said lever member and slidably disposed in a second pair of grooves in said first block, said support means including a support member having a substantially U-shaped cross section with a pair of oppositely extending flanges extending laterally from the extremities of the legs of said support member, and a stationary block secured to said support member, said pair of flanges of said slider member being slidably disposed in a pair of grooves in said stationary block.

13. An assembly as set forth in claim 12 wherein said first flanges extending from said lever member are parallel and arcuate and said second pair of grooves in said first block are parallel and arcuate to maintain said total sliding contact.

14. An assembly as set forth in claim 13 wherein said first block is disposed in sliding engagement with said support means by said flanges of said support member being slidably disposed in a third pair of grooves in said first block, said first pair of grooves in said first block being substantially parallel to said third pair of grooves in said first block, said first pair of grooves in said first block being disposed at an acute angle with said second pair of grooves therein so that said first flanges of said lever member slide along said second pair of grooves in said first block to pivot said lever member relative to said slider member upon movement of said first block relative to said slider member.

15. An assembly as set forth in claim 14 wherein said wedge means includes mount means adapted to support a seat, said mount means and said lever member being movable relative to one another by a second block forced therebetween in a wedge-like action, said lever member and said second block having at least one pair of coacting surfaces which slide relative to one another as said second block moves, and said mount means and said second block having at least one pair of coacting surfaces which slide relative to one another as said second block moves.

16. An assembly as set forth in claim 15 wherein said mount means is pivotally connected to the second end of said lever member, and said coacting surfaces between said second block and said lever member are formed by a second pair of flanges extending from said lever member and slidably disposed in a first pair of grooves in said second block, and said coacting surfaces between said second block and said mount means are formed by a first pair of flanges extending from said mount means and slidably disposed in a second pair of grooves in said second block.

17. An assembly as set forth in claim 16 wherein said second pair of flanges extending from said lever member are parallel and arcuate and said first pair of grooves in said second block are parallel and arcuate to maintain said total sliding contact.

18. An assembly as set forth in claim 17 wherein said first pair of grooves of said second block are disposed at an acute angle with said second pair of grooves therein so that said first pair of flanges extending from said mount means slide along said second pair of grooves in said second block to pivot said mount means relative to said lever member upon movement of said second block relative to said lever member.

19. An assembly as set forth in claim 18 wherein said wedge means includes drive means for moving said slider member relative to said U-shaped member and for moving said first block relative to said slider member to pivot said lever member relative to said slider member and for moving said second block relative to said lever member to pivot said mount means relative to said lever member.

20. An assembly as set forth in claim 19 wherein said drive means includes a first gear box connected to said slider member, a first threaded shaft extending from said first gear box and threadedly engaging a threaded bore in said stationary block whereby said slider member moves relative to said U-shaped member upon rotation of said first threaded shaft, a second gear box pivotally connected to said lever member, a second threaded shaft extending from said second gear box and threadedly engaging a threaded bore in said first block whereby said first block slides along said slider member and said lever member upon rotation of said second threaded shaft to pivot said lever member relative to said slider member, a third gear box pivotally connected to said lever member, and a third threaded shaft extending from said third gear box and threadedly engaging a threaded bore in said second block whereby said second block slides along said lever member and said mount means upon rotation of said third threaded shaft to pivot said mount means relative to said lever member.

21. An assembly as set forth in claim 20 including a second support means and a second wedge means comprising like elements as said first-mentioned support means and said first-mentioned wedge means are disposed in parallel relationship with said first-mentioned support means and said first-mentioned wedge means, a first motor means operatively connected to the first gear box of both of said wedge means whereby said slider members thereof are moved in unison upon actuation of said first motor means to adjust the fore and aft position of the seat to be attached to said mount means, a second motor means operatively connected to the second gear box of both of said wedge means whereby said lever members thereof are pivoted in unison upon actuation of said second motor means to raise and lower one of the rear and front of the seat to be attached to said mount means, and a third motor means operatively connected to said third gear box of both of said wedge means whereby said mount means is pivoted in unison upon actuation of said third motor means to raise and lower the other one of the rear and front of the seat to be attached to said mount means.

22. An adjustable seat assembly comprising: a first member, a second member pivotally connected at a first end thereof to said first member, a first means coacting with said first and second members in a wedge-like action for pivoting said second member relative to said first member, mount means pivotally connected to the second end of said second member, and a second means coacting with said second member and said mount means in a wedge-like action for pivoting said mount means relative to said second member.

23. An assembly as set forth in claim 22 including drive means for moving said first and second means independently of one another.

24. An assembly as set forth in claim 23 wherein said first means comprises a first wedge-shaped block, said first member and said first block having at least one pair of coacting surfaces which slide relative to one another as said first block moves, said second member and said first block having at least one pair of coacting surfaces which slide relative to one another as said first block moves, and at least one pair of said coacting surfaces being arcuate to the degree necessary to maintain total sliding contact between each pair of said coacting surfaces along the entire overlapping length thereof as said first block moves.

25. An assembly as set forth in claim 24 wherein said second means comprises a second wedge-shaped block, said second member and said second block having at least one pair of coacting surfaces which slide relative to one another as said second block moves, said second block and said mount means having at least one pair of coacting surfaces which slide relative to one another as said second block moves, and at least one pair of said coacting surfaces associated with said second block being arcuate to the degree necessary to maintain total sliding contact between each pair of said last-mentioned coacting surfaces along the entire overlapping length thereof as said second block moves.

26. An assembly as set forth in claim 23 including a support means for slidably supporting said first member.

References Cited
UNITED STATES PATENTS

| | | | |
|---|---|---|---|
| 2,100,546 | 11/1937 | Kramer | 248—394 |
| 2,771,263 | 11/1956 | Boho | 248—298 |
| 3,319,921 | 5/1967 | Nichols | 248—294 X |

ROY D. FRAZIER, *Primary Examiner.*

ROBERT P. SEITTER, *Assistant Examiner.*